United States Patent [19]

Nagasawa et al.

[11] Patent Number: 5,734,785
[45] Date of Patent: Mar. 31, 1998

[54] HIGH EFFICIENT IMAGE SIGNAL RECORDING SYSTEM

[75] Inventors: Kenichi Nagasawa; Tadayoshi Nakayama; Chikara Sato; Koji Takahashi, all of Kanagawa-ken, Japan

[73] Assignee: Canon Kabushiki Kaisha, Tokyo, Japan

[21] Appl. No.: 296,615

[22] Filed: Aug. 25, 1994

Related U.S. Application Data

[63] Continuation of Ser. No. 161,994, Dec. 2, 1993, abandoned, which is a continuation of Ser. No. 40,394, Mar. 29, 1993, abandoned, which is a continuation of Ser. No. 798,276, Nov. 20, 1991, abandoned, which is a continuation of Ser. No. 622,264, Dec. 5, 1990, abandoned, which is a continuation of Ser. No. 434,607, Nov. 8, 1989, abandoned, which is a continuation of Ser. No. 243,248, Sep. 8, 1988, abandoned, which is a continuation of Ser. No. 881,822, Jul. 3, 1986, abandoned.

[30] Foreign Application Priority Data

Jul. 4, 1985 [JP] Japan .................. 60-148112
Jul. 8, 1985 [JP] Japan .................. 60-149481

[51] Int. Cl.$^6$ .................................................. H04N 5/91
[52] U.S. Cl. ......................... 386/95; 386/35; 386/109; 360/18
[58] Field of Search ..................... 358/12, 21 R, 358/138, 160, 310, 330, 334, 135, 136, 909.1, 906; 360/22, 24, 9.1, 33.1, 38.1, 32, 18; 382/56; 386/33, 38, 35, 46, 109, 110, 112, 131, 95

[56] References Cited

U.S. PATENT DOCUMENTS

| | | | |
|---|---|---|---|
| 3,541,244 | 11/1970 | Law | 360/9.1 |
| 4,245,235 | 1/1981 | Poetsch | 358/324 X |
| 4,348,699 | 9/1982 | Tsuchiya et al. | 360/32 |
| 4,365,115 | 12/1982 | Nagata et al. | 360/8 |
| 4,371,895 | 2/1983 | Koga | 358/136 |
| 4,386,366 | 5/1983 | Mori | 358/135 |
| 4,597,019 | 6/1986 | Nishimoto et al. | 360/9.1 X |
| 4,608,600 | 8/1986 | Sugiyama | 360/9.1 X |
| 4,623,922 | 11/1986 | Wishermann | 358/21 R |
| 4,626,929 | 12/1986 | Ichinoi et al. | 358/310 |
| 4,630,131 | 12/1986 | Ichinoi et al. | 358/330 X |
| 4,633,326 | 12/1986 | Endoh et al. | 382/56 X |
| 4,641,201 | 2/1987 | Ichinoi et al. | 358/310 |
| 4,661,862 | 4/1987 | Thompson | 360/9.1 X |
| 4,677,479 | 6/1987 | Hatori et al. | 358/135 |
| 4,706,077 | 11/1987 | Roberts et al. | 358/138 X |
| 4,742,558 | 5/1988 | Ishibashi et al. | 382/56 |
| 4,797,741 | 1/1989 | Sato et al. | 364/574 X |

*Primary Examiner*—Andrew L. Sniezek
*Attorney, Agent, or Firm*—Anderson, Kill & Olick, P.C.

[57] ABSTRACT

In an image signal recording system for recording on a recording medium an original image signal corresponding to an original picture which is comprised of a plurality of pixels, the original picture is divided into a plurality of pixel blocks each consisting of a predetermined number of pixels, and image signals each corresponding to the associated pixel block divided are recorded on the recording medium in accordance with a first recording mode and a second recording mode which are mutually different in a recording format. Either of the first and second recording modes is selected on each of the plurality of pixel blocks and a recording mode information signal corresponding to the selected recording mode is generated. There are recorded on the recording medium, the first image information signal or the second image information signal formed and the recording mode information signal generated, on a multiple basis. Thus, it is possible to provide the image signal recording system capable of efficiently recording image signals while suppressing a deterioration of the image quality.

6 Claims, 8 Drawing Sheets

HIGH EFFICIENT IMAGE SIGNAL RECORDING SYSTEM

This is a continuation application of application Ser. No. 08/161,994, filed Dec. 2, 1993 abandoned, which in turn is a continuation application of application Ser. No. 08/040, 394, filed Mar. 29, 1993 abandoned, which in turn is a continuation application of application Ser. No. 07/798,276, filed Nov. 20, 1991, abandoned, which in turn is a continuation application of application Ser. No. 07/622,264, filed Dec. 5, 1990, abandoned, which in turn is a continuation application of application Ser. No. 07/434,607, filed Nov. 8, 1989, abandoned, which in turn is a continuation application of application Ser. No. 07/243,248, filed Sep. 8, 1988, abandoned, which in turn is a continuation application of application Ser. No. 06/881,822, filed Jul. 3, 1986, abandoned.

BACKGROUND OF THE INVENTION

1. Field of the Invention

This invention relates to an information signal recording system for recording information signals.

2. Description of the Related Art

Various methods of recording information signals by compressing them have been contrived during recent years for recording in a highly dense state such information signals that abound with information such as picture information signals, etc.

Figure 1:
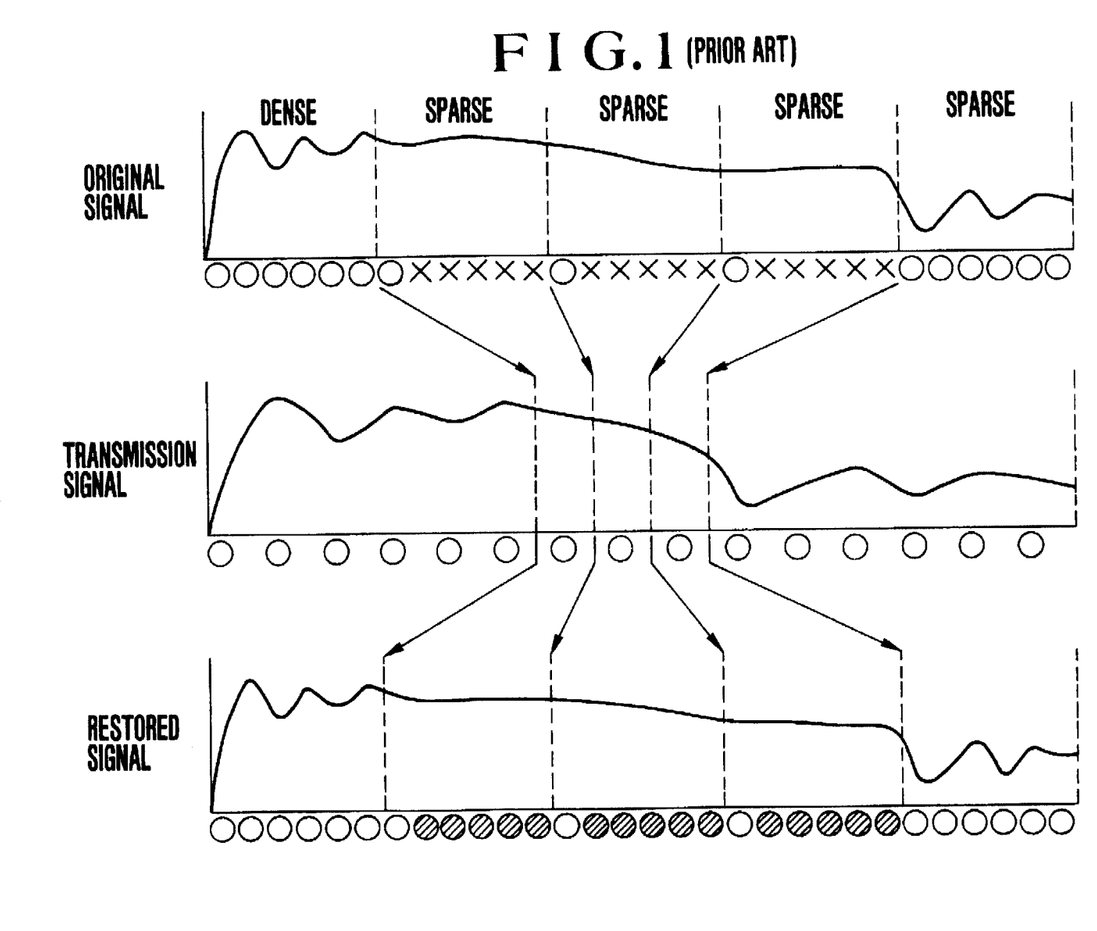
FIG. 1 is an illustration of the operating principle of the conventional time-axis transformation system.

The known information signal compressing methods include a method called time-axis transformation system (hereinafter referred to as TAT system). The TAT system operates on a principle which is as shown in FIG. 1 of the accompanying drawings. Referring to FIG. 1, an original signal is divided into groups to have each of which contain a predetermined amount of information as indicated by broken lines. A discrimination is made between denseness and sparseness of information included in each of these groups. For a group which is determined to be dense, all data obtained by sampling the original signal is transmitted as transmission data. For a group determined to be sparse, only a portion of all the data is transmitted as transmission data while the rest is not transmitted and is processed as thinned-out data.

The number of data to be transmitted per unit time can be reduced by this arrangement. The transmission signal is compressed band-wise from the original signal. The information signal is thus compressed before transmission. After transmission, the signal is restored to the original state on the basis of the data transmitted. In reproducing the original signal, interpolation data is obtained by proximately restoring the thinned-out data using the transmitted data. The interpolation data is positioned in place of the sparse parts and thus closely resembles the thinned-out data. Information thus can be transmitted without being deteriorated from its original state despite the transmission band which is greatly compressed as compared with a bandwidth otherwise necessary for transmission of the whole data.

Each group is examined for the denseness or sparseness of information carried by the original signal in determining whether the group is to be transmitted in a whole data transmitting mode or in a partial data transmitting mode. Then, information on the result of this determination is also transmitted as a transmission mode information signal concurrently with the information signal.

It is conceivable that the information signal compressing method mentioned above can be advantageously applied to magnetic recording and reproduction of information signals. In this case, however, the above-stated transmission mode information signal must be recorded as an auxiliary signal in position corresponding to the position, in which the data (hereinafter referred to as the main information signal) obtained by sampling the original signal is recorded, concurrently with recording of the main information signal. This requirement necessitates arrangement of an auxiliary information signal recording area along with a main information signal recording area on the recording medium. In addition to this, the timing for recording and reproduction of these main and auxiliary information signals must be precisely controlled for adequate correlation between them. However, uneven degrees of precision in mounting recording and reproducing heads and the like among similar recording and reproducing apparatuses hinder such precise control. Therefore, it has been difficult to adequately reproduce original signals. Further, in the case of high density recording, the above-stated arrangement to provide the main and auxiliary information signal recording areas on the recording medium is not acceptable as it is against the efforts to attain an increased degree of density.

SUMMARY OF THE INVENTION

It is a general object of this invention to provide an information signal recording system which is capable of solving the above-stated problems of the prior art.

It is a more specific object of this invention to provide an information signal recording system which, in recording information signals by compressing them at one of varied rates of compression as applicable, is capable of recording them in a manner that ensures stable and adequate reproduction of these signals.

Under this object, an information signal recording system, arranged, as an embodiment of this invention, to divide original information signals into signal groups, each bearing a predetermined amount of information, to have a plurality of compressing modes for different information compressing ratios, and to compress the information signals of each group in one of the different compressing ratios in recording these signals on a magnetic recording medium, comprises: first compressed information signal forming means which operates on all these groups to form and produce a first compressed information signal consisting of only the information signals of a specific part of each of these groups; second compressed information signal forming means which operates at least on some of these groups to form and produce a second compressed information signal consisting of information signals of each group excluding the information signals of the specific part; compressing mode signal generating means arranged to determine one of the plurality of compressing modes to be employed in compressing the information signals of each group and to produce a compressing mode signal indicative of the mode employed; a magnetic head which records signals on the magnetic recording medium by tracing the medium; recording information signal forming means for forming and producing a recording information signal by using the first and second compressed information signals produced by the first and second compressed information signal forming means according to the compressing mode signal produced from the compressing mode signal generating means; and frequency multiplexing means for frequency multiplexing the compressing mode signal produced from the compressing mode signal generating means together with the recording information signal produced from the recording information signal forming means.

It is another object of this invention to provide an information signal recording system which, in recording information signals by compressing them at one of varied rates of compression as applicable, is capable of recording them in a highly dense state.

Under that object, an information signal recording system, arranged, as another embodiment of this invention, to divide original information signals into signal groups, each bearing a predetermined amount of information, to have a plurality of compressing modes for different information compressing ratios, and to compress the information signals of each group in one of the different compressing ratios in recording these signals on a magnetic recording medium, comprises: first compressed information signal forming means which operates on all these groups to form and produce a first compressed information signal consisting of only the information signals of a specific part of each of these groups; second compressed information signal forming means which operates at least on some of these groups to form and produce a second compressed information signal consisting of information signals of each group excluding the information signals of the specific part; compressing mode signal generating means arranged to determine one of the plurality of compressing modes to be employed in compressing the information signals of each group and to produce a compressing mode signal indicative of the mode employed; recording information signal forming means for forming and producing a recording information signal from the first and second compressed information signals; a magnetic head which records signals on the magnetic recording medium by tracing the medium; frequency multiplexing means for frequency multiplexing the compressing mode signal produced from the compressing mode signal generating means together with the recording information signal produced from the recording information signal forming means; and compressing mode signal generation control means for controlling the compressing mode signal generating means in such a manner that the compressing mode signal is multiplexed at a specific part of the recording information signal by the frequency multiplexing means.

The above and other related objects and features of this invention will become apparent from the following detailed description of embodiments thereof taken in connection with the accompanying drawings.

DETAILED DESCRIPTION OF THE PREFERRED EMBODIMENTS

Figure 2:
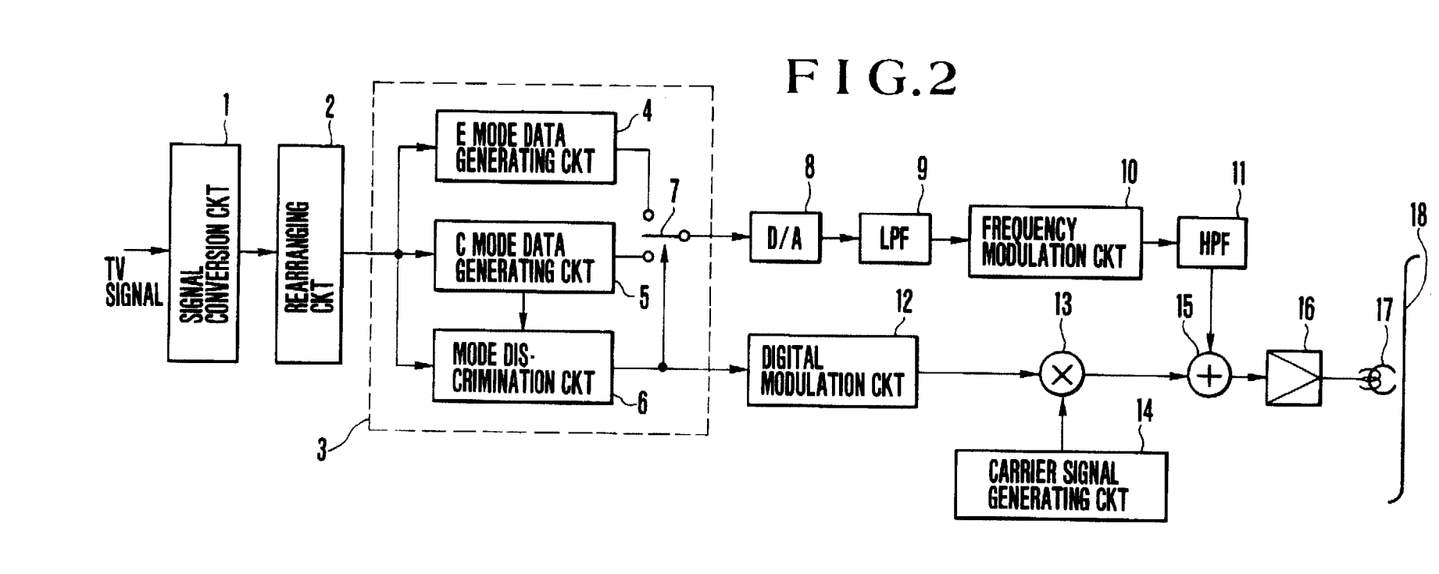
FIG. 2 is a block diagram showing, in outline, the recording system of a TV signal recording and reproducing system arranged as an embodiment of this invention.

In an embodiment described below, the present invention is applied to a TV signal recording and reproducing system. FIG. 2 shows, in outline, the recording system of this embodiment. An incoming TV signal is converted by a signal conversion circuit 1 into data suited for compression of an information signal. The picture element data which is thus obtained is rearranged by a rearranging circuit 2 into data arrangement suited for information signal compression. The picture element data which is thus rearranged is supplied to an information signal compression circuit 3, the details of which will be described later herein.

Figure 3:
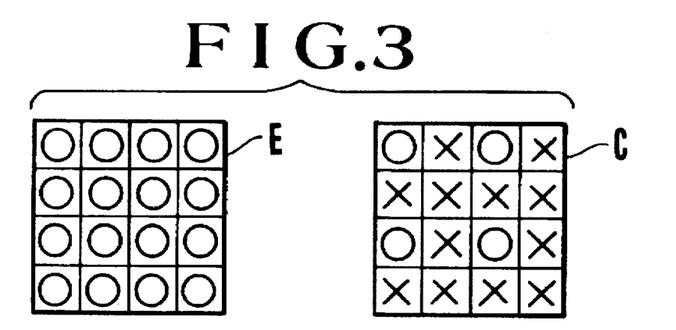
FIG. 3 is an illustration of the information signal compressing operation of the TV signal recording and reproducing system of FIG. 2.

FIG. 3 is an illustration of an information signal compressing process for a picture element block which is obtained by dividing one picture plane into many blocks. In FIG. 3, a symbol "O" denotes transmission data and another symbol "X" thinned-out data, respectively. A picture element block, part E of FIG. 3, shows a data transmission mode in which the information signal is not compressed. Another picture element block, part C, shows a data transmission mode in which the information signal is compressed for data transmission. Hereinafter these two different data transmission modes will be called the mode E and the mode C, respectively. As apparent from this illustration, the data is compressed for transmission in the mode C to an extent of ¼ of the mode E. In thinning out the data in the vertical and horizontal directions of the picture plane within each of the divided picture element blocks, each block must be correlated with other blocks located adjacent thereto.

Figure 4A:
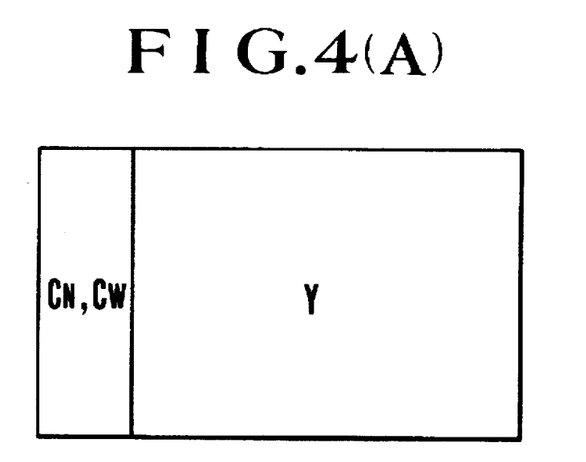
FIGS. 4(A) and 4(B) are schematic views showing the forms of signals processed by the TV signal recording and reproducing system of FIG. 2
Figure 4B:
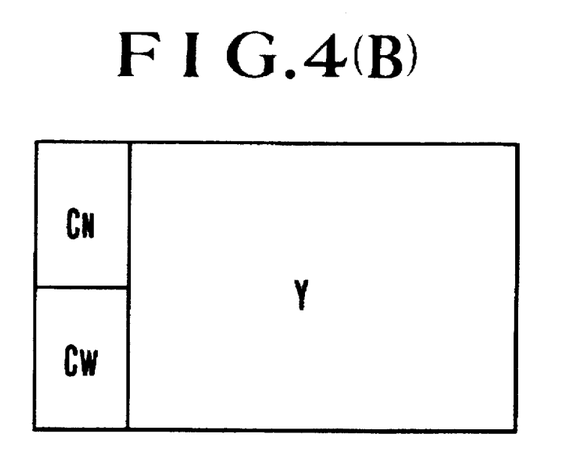

Again referring to FIG. 2, to meet the above-stated requirement, the signal conversion circuit 1 and the rearranging circuit 2 are arranged to perform the following processes: The incoming TV signal has the picture element data of line sequential color difference signals CN and CW arranged within a ⅓ part in the first half of each horizontal scanning period. The picture element data of a luminance signal Y of the TV signal is arranged in a ⅔ part in the latter half of the horizontal scanning period as shown in FIG. 4(A), which schematically shows this signal arrangement as a reproduced picture plane. The rearranging circuit 2 is arranged to read out the picture element data by using a field memory or the like in such a way as to arrange the color difference signals CN and CW to have positional correlatively also in the vertical direction. FIG. 4(B) schematically shows the signal arrangement thus obtained.

Figure 5:
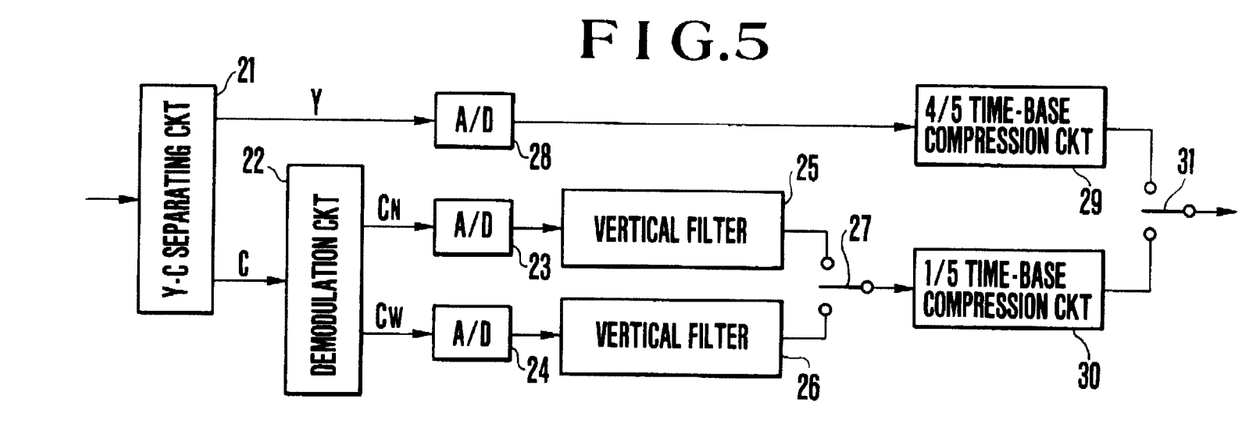
FIG. 5 is a block diagram showing, by way of example, the arrangement of a signal conversion circuit included in the TV signal recording and reproducing system of FIG. 2.

FIG. 5 shows, by way of example, the arrangement of the signal conversion circuit 1 of FIG. 2. A TV signal which is an NTSC signal is first supplied to a Y-C separating circuit 21. The circuit 21 separates a luminance signal Y and a chrominance signal C from each other. The chrominance signal C is converted by a demodulation circuit 22 into two color difference signals CN and CW. The color difference signals CN and cw are applied, respectively, via analog-to-digital (A/D) converters 23 and 24 to vertical filters 25 and 26. The filters 25 and 26 are arranged to impose band restriction in the vertical direction of the picture plane for the purpose of a line sequential process. The outputs of these filters 25 and 26 are line serialized with the connecting position of a switch 27 arranged to be shifted at every horizontal scanning period. The line sequential color difference signals thus obtained are time-base compressed to ⅓ by a ⅓ time-base compression circuit 30. Meanwhile, the luminance signal Y is supplied via an A/D converter 28 to a ⅘ time-base compression circuit 29 to be time-base compressed to ⅘ there. The time-base compressed luminance signal and the line sequential color difference signals are selectively read out by a switch 31 to obtain a video signal as shown in FIG. 4(A).

In the rearranging circuit 2, therefore, positions within the field memory are shifted such that: the color difference signal CN of a line 2$i$–$l$ is rearranged on a line $i$ and the color difference signal CW of a line 2$i$ rearranged on a line (j+1), wherein "i" represents an integer between 1 and j.

The video signal which is thus obtained is supplied to the information signal compression circuit 3 as shown in FIG. 2 to be processed as follows: The data produced from the rearranging circuit 2 is supplied to an E mode data generating circuit 4, a C mode data generating circuit 5 and a mode discriminating circuit 6. The E mode data generating circuit 4 is supplied with the video signal shown in FIG. 4(B) from the rearranging circuit 2 and, to each block of the supplied video signal, the picture element data of all picture elements which constitute each picture element block, as shown by the picture element block E in FIG. 3, are stored in a frame memory in the E mode data generating circuit for every picture element block.

The C mode data generating circuit 5 also receives the video signal shown in FIG. 4(B) from the rearranging circuit 2. In the C mode data generating circuit 5, a thinning out process is performed as shown in FIG. 3 upon receipt of the data. One field portion of transmission data is then stored in a memory provided within the above-stated C mode data generating circuit 5. At the same time, the whole picture element data for one field is stored in a frame memory provided within the E mode data generating circuit 4.

Meanwhile, the C mode data generating circuit 5 computes interpolation data corresponding to the thinned-out data on the basis of the transmitted data of the mode C. A part of the picture element data (picture element indicated by O in the picture element block C in FIG. 3) among the picture elements constituting each picture element block shown by the picture element block C in FIG. 3 are extracted and stored in the memory in the C mode data generating circuit 5, while for each picture element block, the picture element data of the picture element which have not been extracted (indicated by the picture element block C in FIG. 3) are subjected to the interpolation processing by using the picture element data (transmitted data) of the extracted picture element, whereby the interpolation data are calculated. The computed interpolation data is supplied to the mode discrimination circuit 6. The mode discrimination circuit 6 is supplied with the video signal shown in FIG. 4(B) and the difference between the actual picture element data of each picture element block of the supplied video signal and the interpolation data calculated and supplied by the C mode data generating circuit is calculated. The circuit 6 then computes the amount of the difference (i.e. the distortion factor) between the actual picture element data and the interpolation data in each picture element block for one frame. The difference (or distortion value) is thus checked for every picture element block. The difference value thus obtained is stored in a memory which is provided within the mode discrimination circuit 6 for storing the distortion value for one field. Then, before arrival of data for a next field, the distribution of the distortion values of all the picture element blocks is obtained. Further, to make unvarying the transmission time required in transmitting one field portion of the video signal, the ratio between the number of picture element blocks to be transmitted in the mode C and that of picture element blocks to be transmitted in the mode E must be predetermined. Under the assumption that the modes C and E are in the ratio of ⅔·0 to ⅓, the overall compression rate of the information signal for one field can be expressed as (⅔×¼+1×⅓=½. Therefore, for the purpose of determining a distortion value to be used as a boundary of allocation between the mode C and the mode E, a distortion threshold value is predetermined.

The distortion values which are stored in the distortion value memory are read out one after another at a timing for producing a video signal for a next field. Then, the distortion value thus read out is compared with the predetermined distortion threshold value for determining the transmission mode. A transmission mode information signal is then produced according to the transmission mode thus determined. The data transmission is performed in the mode C and in the mode E in the above-stated predetermined ratio when the distortion value thus read out coincides with the distortion threshold value.

The transmission mode information signal which is obtained in the manner as mentioned above is supplied to a switch 7. Then, the data stored at the memory in the E mode data generating circuit 4 and the data stored at the memory in the C mode data generating circuit 5 are selectively read out via the switch 7 according to the transmission mode information signal. Through the operation of the arrangement described, the data supplied by the switch 7 is compressed by ½.

The data produced from the switch 7 is supplied to a D/A converter 8 to be converted back into an analog signal. The analog signal is supplied to a frequency modulation circuit 10 after undergoing a band limiting process carried out by a low-pass filter (LPF) 9. Meanwhile, the transmission mode information signal produced from the mode discrimination circuit 6 is digital modulated by a digital modulation circuit 12 through, for example, a known MFM or BPM modulation process and is then supplied to a multiplier 13. At the multiplier 13, a carrier signal, which is received from a carrier signal generating circuit 14, is modulated by the digital-modulated transmission mode information signal. Assuming that the number of picture elements of the picture plane for one field is 900×240 and the number of picture elements included in each picture element block is 4×4, the number of picture element blocks included in the picture plane for one field is 225×60. Then, the frequency of the transmission mode information signal becomes (225×60× 60)=910 KHz.

Accordingly, the frequency of the carrier signal produced from the carrier signal generating circuit 14 is arranged to be 2 or 3 MHz or thereabout. The cut-off frequency of a high-pass filter (HPF) 11 is arranged to be 1.5 MHz or thereabout. This arrangement permits an adder 15 to perform a frequency multiplexing operation on the modulated transmission mode information signal produced from the multipler 13 and the frequency modulated video signal produced from the HPF 11.

Figure 6:
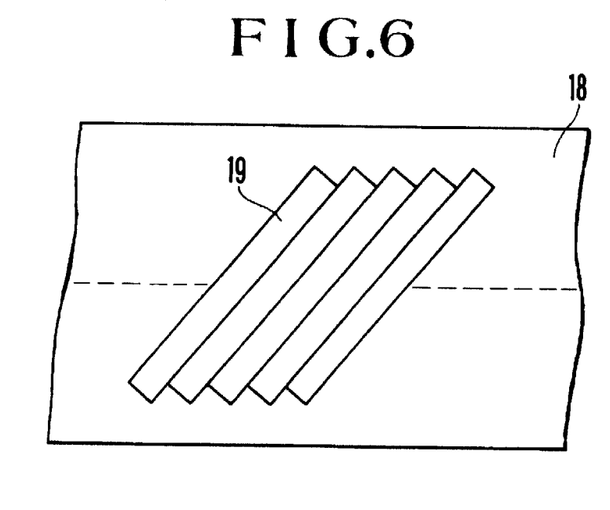
FIG. 6 is a schematic view showing a manner in which the TV signal recording and reproducing system of FIG. 2 performs recording on a recording medium.

The output signal of the adder 15 is supplied via an amplifier 16 to a rotary magnetic head 17 to be recorded on a magnetic tape 18. FIG. 6 schematically shows the manner in which the signal is recorded on the magnetic tape. As shown, the signal is recorded in helical recording tracks 19 in the same manner as in the case of the conventional home video tape recorders.

Figure 7:
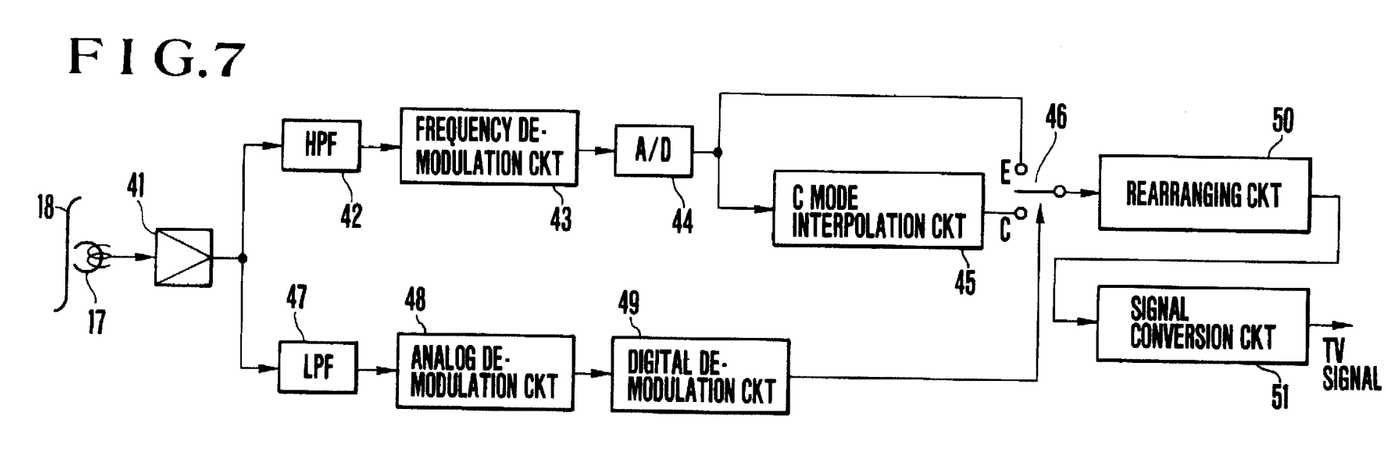
FIG. 7 is a block diagram showing, by way of example, the arrangement of a reproducing system of the TV signal recording and reproducing system of FIG. 2.

FIG. 7 shows, in outline, the arrangement of a reproduction system included in the recording and reproducing system of FIG. 2. A signal reproduced by the head 17 from the magnetic tape 18 is amplified by a reproduction amplifier 41. The amplified reproduced signal is supplied to an HPF 42 and an LPF 47. A frequency modulated video signal is separated at the HPF 42 and is then frequency demodulated at a frequency demodulation circuit 43. The demodulated video signal is brought back into a digital signal at an A/D converter 44. The output of the A/D converter 44 is supplied to a C mode interpolation circuit 45. At the circuit 45, proximate interpolation data which corresponds to the data X shown in the part C of FIG. 3 and is close to non-transmitted data is computed by using the transmitted data of the mode C. The proximate interpolation data which is thus computed is stored in a memory provided within the C mode interpolation circuit 45.

Meanwhile, the modulated transmission mode information signal is separated at an LPF 47. The output of the LPF 47 is supplied via analog and digital demodulation circuits 48 and 49 to a switch 46 to control the operation of the switch. The connecting position of the switch 46 is on one side E thereof when the output of the digital demodulation circuit 49 indicates the mode E and is on the other side C when the output of the circuit 49 is indicative of the mode C. Through this operation of the switch 46, the transmitted data of the mode C and the interpolation data are stored in a memory provided within a rearranging circuit 50 in a manner as shown in FIG. 4(B). At the rearranging circuit 50, the memory is controlled to have the data which is received in the order of FIG. 4(B) produced in the order as shown in FIG. 4(A). The data produced from the rearranging circuit 50 is supplied to a signal conversion circuit 51 to be brought back into the state of the NTSC signal before it is produced. The details of the above-stated signal conversion circuit 51 are as shown in FIG. 8.

Figure 8:
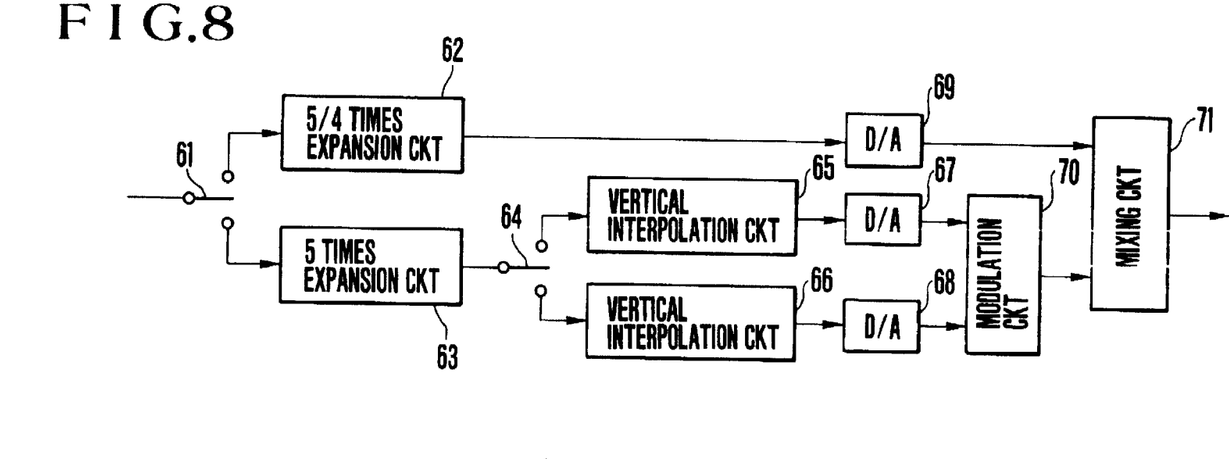
FIG. 8 is a block diagram showing, by way of example, the arrangement of the signal conversion circuit included in the TV signal recording and reproducing system of FIG. 7.

Referring to FIG. 8 which shows the details of the signal conversion circuit 51 of FIG. 7, the picture element data of the luminance signal Y among the data produced from the rearranging circuit 50 is supplied via a switch 61 to a 5/4 times time-base expansion circuit 62. The picture element data of the line sequential color difference signals CN and CW, which are also produced from the circuit 50, are supplied also via the switch 61 to a 5 times time-base expansion circuit 63. These time-base expansion circuits 62 and 63 are arranged to produce their outputs at the same timing for the same horizontal scanning line. The picture element data of the line sequential color difference signals CN and CW produced from the 5 times expansion circuit 63 are separated from each other by a switch 64 to be supplied to vertical interpolation circuits 65 and 66, respectively. The circuits 65 and 66 are arranged to generate data for lines having no color difference signals CN and CW through interpolation processes, respectively. D/A converters 67, 68 and 69 are arranged to convert the picture element data of the signals CN, CW and Y into analog signals respectively. The signals CN and CW, which are thus restored to their original states, are supplied to a modulation circuit 70 to be modulated into the original chrominance signal. The chrominance signal thus obtained is mixed with the restored luminance signal at a mixing circuit 71. The mixing circuit then produces a restored NTSC signal.

In the TV signal recording and reproducing system described above as an embodiment of this invention, the compressed video signal and the transmission mode information signal are arranged to be recorded and reproduced by one and the same head. Therefore, no time deviation arises between the compressed video signal and the transmission mode information signal during recording and reproduction. This arrangement ensures adequate reproduction of signals. The arrangement also obviates the necessity of providing any additional area on the recording medium solely for recording the transmission mode information signal. Further, in this specific embodiment, two transmission modes E and C are arranged. However, the number of transmission modes may be changed to be three or more instead of two. In the event of such modification, some modification is required also in the form of recording as the recording frequency for the transmission mode information signal increases.

The application of the invented arrangement is not limited to magnetic recording.

The TV signal recording and reproducing system arranged as described above is capable of recording information in such a way as to permit adequate reproduction in cases where the information is to be compressed for recording at different rates of compression for different groups, each of which bears a predetermined amount of information.

Figure 9:
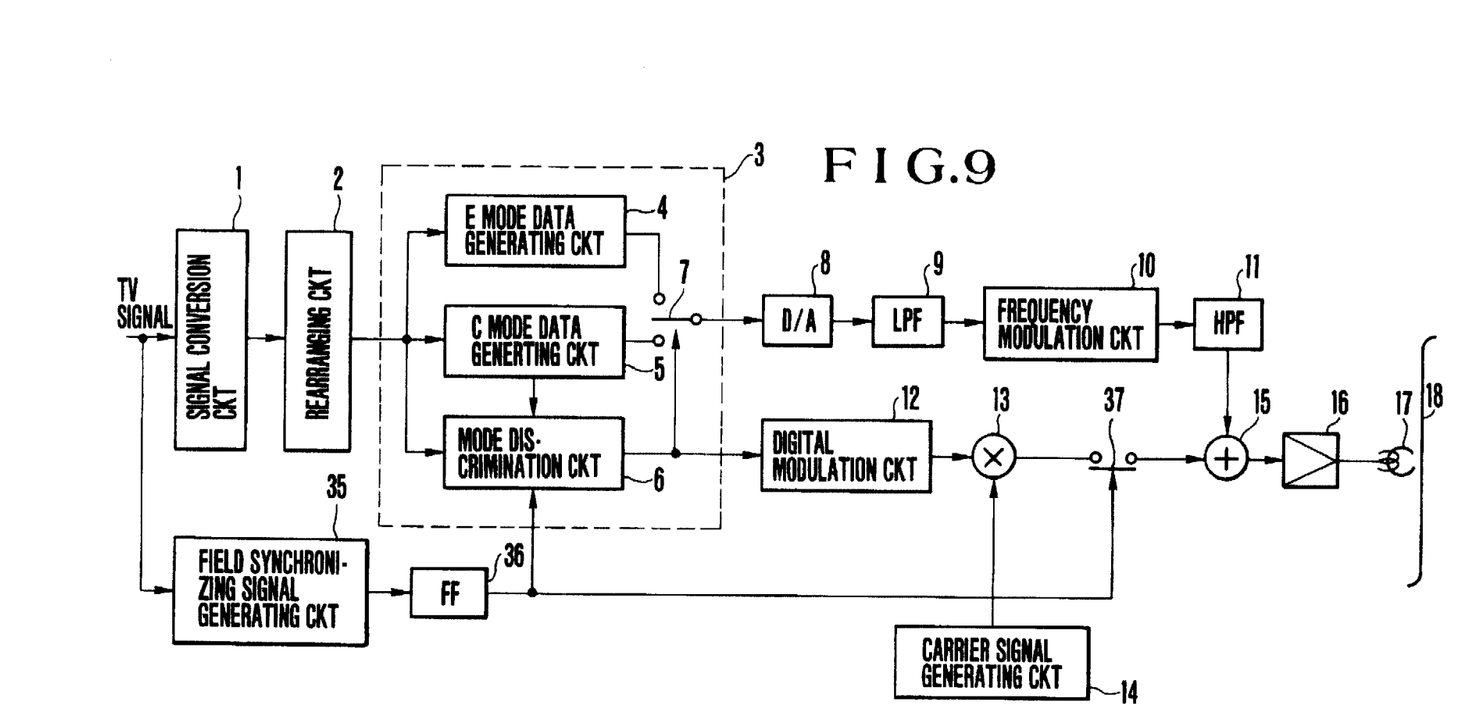
FIG. 9 is a block diagram showing, in outline, the arrangement of a TV signal recording and reproducing system arranged as another embodiment of this invention.

Another example in which this invention is also applied to a TV signal recording and reproducing system is as described below:

FIG. 9 shows, in outline, the arrangement of a recording system included in the recording and reproducing system arranged as the above-stated another embodiment. In FIG. 9, the parts which are equivalent to those shown in FIG. 2 are indicated by the same reference numerals and the details of them are omitted from the following description: An incoming TV signal is converted into a video signal in which data is rearranged to be suitable for information signal compression by the signal conversion circuit 1 and the rearranging circuit 2 in the same manner as described in the foregoing with reference to FIG. 2. Upon completion of the converting process, the transmission data of the mode E and that of the mode C are obtained from the video signal at an E mode data generating circuit 4 and a C mode data generating circuit 5. The E mode transmission data and the C mode transmission data are respectively stored in memories provided within these circuits 4 and 5.

A mode discrimination circuit 6 is arranged to compute a difference between actual picture element data and an interpolation data which corresponds to thinned-out data and is computed from the C mode transmission data at the C mode data generating circuit 5. The circuit 6 then determines, according to the computed difference, a transmission mode to be employed in the same manner as in the case of FIG. 2. Information on this mode is then stored in a memory provided within the circuit 6. The mode discrimination circuit 6 then produces a transmission mode information signal indicative of the transmission mode thus determined to be employed. The transmission mode information signal is supplied to a switch 7 which selectively reads out data from the memory of the E mode data generating circuit 4 or from the memory of the C mode data generating circuit 5 according the transmission mode information signal. In this specific embodiment, one and the same mode discrimination signal is arranged to be used for two fields. This arrangement is readily feasible by means of the memory provided within the mode discrimination circuit 6.

The data produced from the switch 7 is supplied to a digital-to-analog (D/A) converter 8 to be converted back into an analog signal. The analog signal thus obtained is supplied to a low-pass filter (LPF) 9 to undergo a band limiting process. The output of the LPF 9 is supplied to a frequency modulation circuit 10. Meanwhile, the transmission mode information signal produced from the mode discrimination circuit 6 is supplied to a digital modulation circuit 12 to be digitally modulated, for example, through a known MFM or BPM modulation process or the like. The output of the circuit 12 is supplied to a multiplier 13. At the multiplier 13, a carrier signal, which is produced from a carrier signal generating circuit 14, is modulated by the digitally modulated transmission mode information signal. Assuming that the number of picture elements of the picture plane for one field is 900×240 and the number of picture elements included in each of picture element blocks is 4×4, the number of picture element blocks included in the picture plane for one field is 225×60. Then, the frequency of the transmission mode information signal becomes (225×60× 60=) 910 KHz. Assuming that the frequency of the carrier signal produced from the carrier signal generating circuit 14 is 2 to 3 MHz or thereabout, recording can be accomplished by the so-called azimuth overlapped writing method convertionally employed for home video tape recorders. Meanwhile, in the event of a signal below 1 KHz, an azimuth loss becomes smaller and thus brings about a problem relative to a cross-talk between adjacent recording tracks occurring during reproduction.

To solve this problem, in the case of this embodiment, the transmission mode information signal is frequency multiplexed not for all the recording tracks but for every other track. In other words, the tracks having the transmission mode information signal are arranged alternately with tracks not having the signal.

With the frequency of the carrier signal supplied to the frequency modulation circuit 10 assumed to be 2 to 3 KHz or thereabout, arranging the cut-off frequency of a high-pass filter 11 at 1.5 MHz enables the modulated transmission mode information signal produced from the multiplier 13 and the frequency modulated video signal produced from the HPF 11 to be frequency multiplexed.

Figure 10:
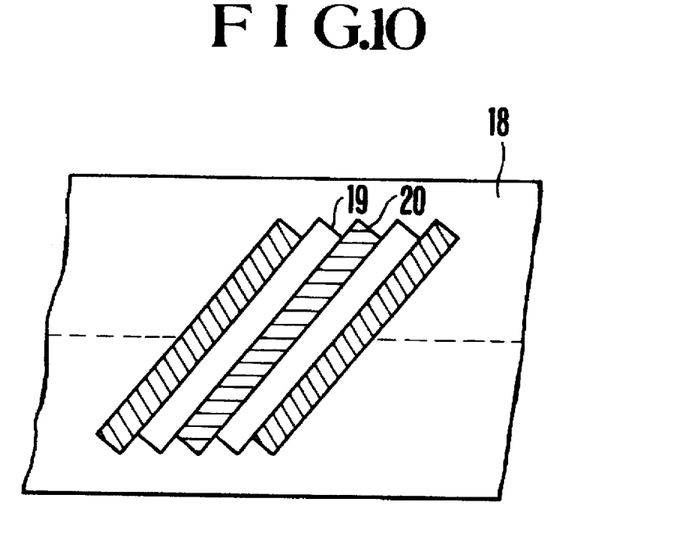
FIG. 10 is a schematic view showing a manner in which the TV signal recording and reproducing system of FIG. 9 performs recording on a recording medium.

A field synchronizing signal generating circuit 35 is arranged to form a field synchronizing signal on the basis of the vertical synchronizing signal of the incoming TV signal. A flip-flop (hereinafter referred to as FF) 36 is arranged to make this field synchronizing signal into a rectangular wave signal which is inverted at every one-field period. The output of the FF 36 controls a switch 37. Assuming that one field portion of the compressed video signal is to be recorded in one recording track, the switch 37 is arranged to turn on and off upon completion of recording in every track. The output of the switch 37 and that of the HPF 11 are frequency multiplexed at an adder 15. The output of the adder 15 is supplied via an amplifier 16 to a rotary magnetic head 17 to be recorded thereby on a magnetic tape 18. FIG. 10 shows a form in which recording is made on the magnetic tape 18. As shown, helical tracks 19 in which the transmission mode information signal is multiplexed or superimposed are arranged alternately with helical tracks which do not have that signal. The absence of the transmission mode information signal from some of the fields presents no problem with the correlativity of the video signal in the time-axial direction used in a manner as will be described later herein.

Figure 11:
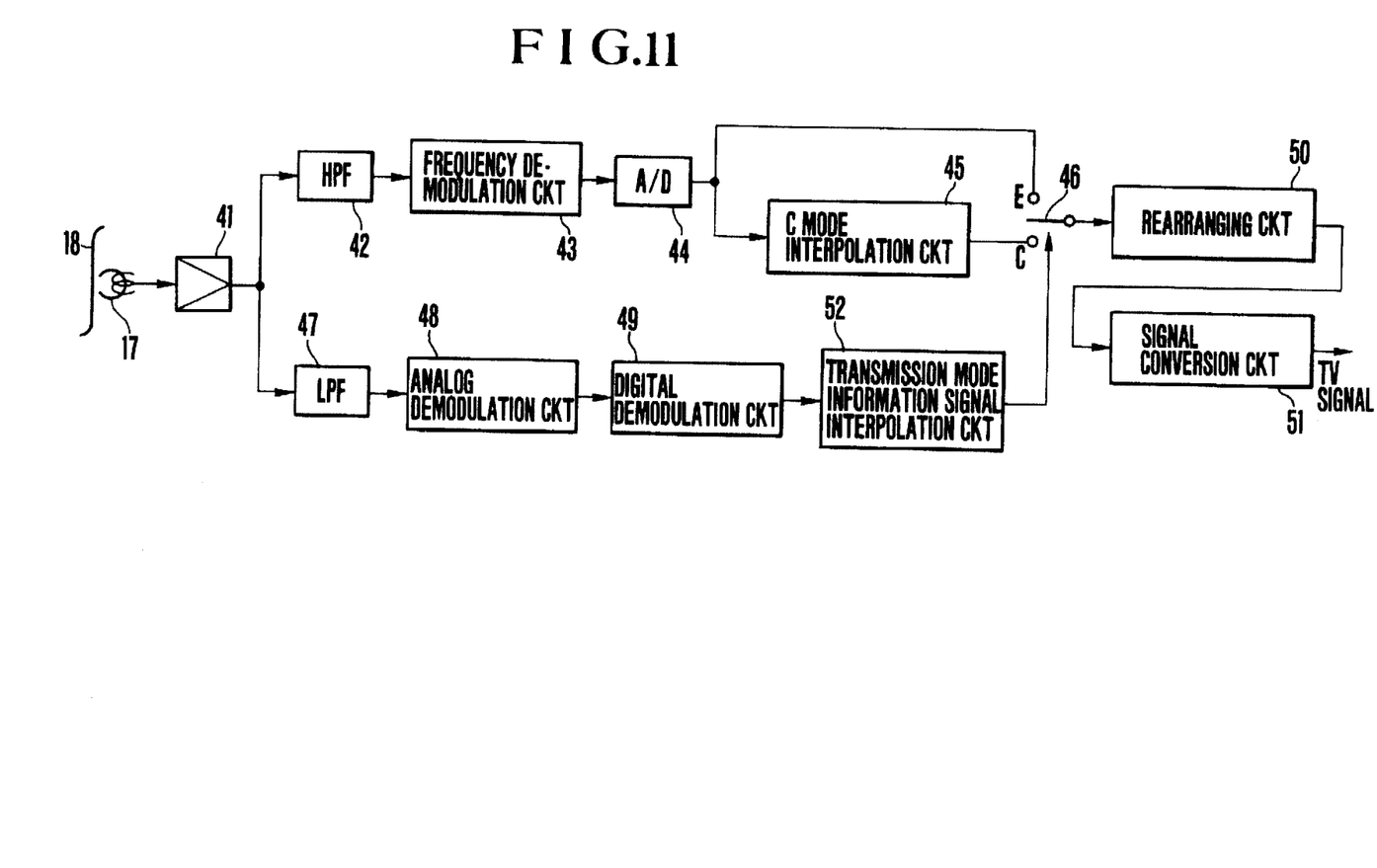
FIG. 11 is a block diagram showing, in outline, the arrangement of a reproduction system included in the TV signal recording and reproducing system of FIG. 9.

FIG. 11 shows, in outline, the arrangement of a reproduction system included in the recording and reproducing system of FIG. 9. In FIG. 11, the parts similar to those shown in FIG. 7 are indicated by the same reference numerals and the details of them are omitted from the following description: A reproduced signal obtained by the head 17 from the magnetic tape 18 is amplified by a reproduction amplifier 41. The amplified reproduced signal is supplied to an HPF 42 and an LPF 47. The HPF 42 separates a frequency modulated video signal. The modulated video signal is frequency demodulated at a frequency demodulation circuit 43. The demodulated video signal is converted back into a digital signal by an A/D converter 44. The output of the A/D converter 44 is supplied to a C mode interpolation circuit 45. The circuit 45 computes interpolation data by using the transmitted data of the mode C to obtain interpolation data in close proximity to non-transmitted data which corresponds to the data X shown at the part C in FIG. 3. The interpolation data thus obtained is stored at a memory provided within the C mode interpolation circuit 45. Meanwhile, a modulated transmission mode information signal is separated by the LPF 47 and is supplied via an analog demodulation circuit 48 and a digital demodulation circuit 49 to a transmission mode information interpolation circuit 52.

Assuming that the transmission mode information signal is formed by the recording system always on the basis of the video signal of a first (or an odd number) field, for example, the transmission mode information signal is superimposed on the compressed video signal of the first field. Then, the transmission mode signal interpolation circuit is arranged to use a memory provided therein in such a manner as to ensure that the transmission mode information signal is read out not only during reproduction of the compressed video signal of the first field but also during reproduction of the video signal of the second field. The transmission mode information signal thus can be obtained for the compressed video signal of all the fields. The switch 46 is controlled by this mode information signal. The connecting position of the switch 46 is on the side of the terminal E as shown in the drawing when the output of the digital demodulation circuit 49 indicates the mode E and is on the side of the other terminal C when it indicates the mode C. The data transmitted in the mode E, the data transmitted in the mode C and the interpolation data are then stored at a memory provided within a rearranging circuit 50 in a manner as shown in FIG. 4(B). At the rearranging circuit 50, the memory is controlled such that the data coming in the order as shown in FIG. 4(B) is produced in the order as shown in FIG. 4(A). The data thus produced from the rearranging circuit 50 is supplied to a signal conversion circuit 51 to be produced in the form of the original NTSC signal. The details of the signal conversion circuit 51 is similar to the arrangement shown in FIG. 8 and thus requires no further description here.

Figure 12:
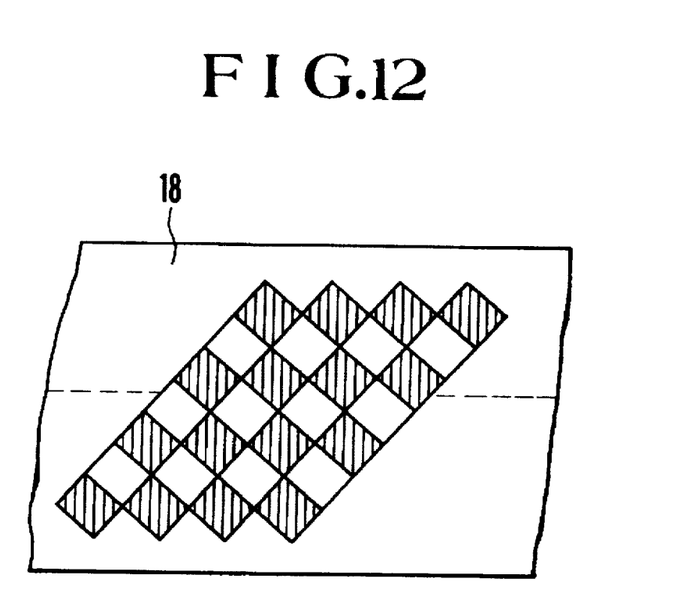
FIG. 12 is a schematic view showing another manner in which the TV signal recording and reproducing system of FIG. 9 performs recording on a recording medium.

The embodiment described above is capable of efficiently performing a high density recording operation on the transmission mode information signal and the compressed video signal. In this case, the tracks having the transmission mode information signal superimposed therein and the tracks not having the transmission mode information signal are alternately arranged. However, this arrangement may be changed to divide each track into a plurality of areas and to have the transmission mode information signal superimposed and recorded in some of these areas in each of the tracks in a checked pattern in such a manner that the transmission mode information signal recorded in one track never comes in the same position as in adjacent tracks. FIG. 12 shows this recording pattern formed on the magnetic tape 18. In FIG. 12, hatched parts show the areas having the transmission mode information signals frequency multiplexed or superimposed there.

Further, in the embodiment described, both the recording and reproduction systems are arranged to have the transmission mode information signal for one field used in common for two field portions of the video signal. However, this arrangement of the embodiment may be changed to have the transmission mode information signal for two fields frequency multiplexed and recorded with one field portion of the video signal.

The specific embodiment described is arranged to have two different transmission modes E and C. However, the arrangement may be changed to have three or more transmission modes. In that instance, some modification is required in the form of recording as the recording frequency for the transmission mode information signal increases. The application of the arrangement of this embodiment is not limited to magnetic recording.

The TV signal recording and reproducing system which is arranged as described above as an embodiment of this invention is capable of recording a compressed information signal in a highly dense state and is capable of adequately restoring the recorded information to the original state of information.

What is claimed is:

1. An image signal recording system for generating recording image data out of image signals for one frame in accordance with a first recording mode and a second recording mode wherein the respective amounts of recording data generated out of the image signals having a predetermined amount of information are different from each other and for recording on a recording medium the recording image data thus generated, said image signal recording system comprising:

(A) picture element data generation means for receiving the image signals for one frame, generating a plurality of picture element data out of the image signals for one frame thus received, and outputting the plurality of picture element data thus generated;

(B) recording image data generation means for receiving the picture element data outputted by the picture element data generation means, generating with the picture element data thus received for every predetermined number of unit data a first recording image data according to the first recording mode and a second recording image data according to the second recording mode, outputting thereafter;

(C) recording mode selection means for receiving the picture element data outputted by the picture element data generation means, selecting either to generate the first recording image data according to the first recording mode or to generate the second recording image data according to the second recording mode for every predetermined number of unit data with respect to the picture element data thus received, and for generating a recording mode information signal in accordance with one of the recording modes to have been selected;

(D) output control means for selectively outputting either the first recording image data or the second recording image data by the recording image data generation means in accordance with the recording mode information signal generated by the recording mode selection means; and (E) recording means for multiplexing either of the first recording image data and the second recording image data outputted by the recording image data generation means with the recording mode information signal generated by the recording mode selection means and recording on the recording medium the data thus multiplexed with the recording mode information signal.

2. An image signal recording system for generating recording image data with image signals for one frame according to a first recording mode and a second recording mode wherein the respective amounts of recording data generated out of the image signals having a predetermined amount of information are different from each other and for recording on a recording medium the recording image data thus generated, said image signal recording system comprising:

(A) picture element data generation means for receiving the image signals for one frame, generating a plurality of picture element data out of the image signals for one frame thus received, and outputting the plurality of picture element data thus generated;

(B) recording image data generation means for receiving the picture element data outputted by the picture element data generation means, generating with the picture element data thus received for every predetermined number of unit data a first recording image data according to the first recording mode and a second recording image data according to the second recording mode, outputting thereafter;

(C) recording mode selection means for receiving the picture element data outputted by the picture element data generation means, selecting either to generate the first recording image data according to the first recording mode or to generate the second recording image data according to the second recording mode for every predetermined number of unit data with respect to the picture element data thus received, and for generating a recording mode information signal in accordance with one of the recording modes to have been thus selected;

(D) output control means for selectively outputting either the first recording image data or the second recording image data by said recording image data generation means in accordance with the recording mode information signal generated by the recording mode selection means; and (E) recording means for recording on the recording medium a recording signal to be generated by multiplexing either of the first recording image data and the second recording image data outputted by the recording image data generation means with said recording mode information signal generated by said recording mode selection means.

3. An image signal recording system according to claim 2, wherein said recording medium includes a magnetic recording medium.

4. An image signal recording system according to claim 3, wherein said recording means includes:

(A) magnetic head means for forming a plurality of tracks through recording on said magnetic recording medium recording signals corresponding to image signals for one frame; and (B) multiplexing means for supplying to said magnetic head means, as a recording signal, a signal generated by multiplexing either the first recording image data or the second recording image data outputted by said recording image data generation means with the recording mode information signal generated by said recording mode selection means, so as to cause the recording mode information signal to be recorded on any of the plurality of tracks formed on the magnetic recording medium with the recording magnetic head.

5. An image signal recording system according to claim 2, wherein said recording medium includes a magnetic tape.

6. An image signal recording system according to claim 5, wherein said recording means includes:

(A) a moving mechanism for moving said magnetic tape in a longitudinal direction of said magnetic tape; and (B) a rotary magnetic head for tracing the magnetic tape in a direction crossing the longitudinal direction of the magnetic tape in such a way as to record on the magnetic type, as a recording signal, a signal generated by multiplexing either the first recording image data or the second recording image data outputted by said recording image data generation means with the recording mode information signal generated by said recording mode selection means.

* * * * *